(12) United States Patent
Dam et al.

(10) Patent No.: US 8,538,102 B2
(45) Date of Patent: Sep. 17, 2013

(54) OPTIMISED REGION OF INTEREST SELECTION

(75) Inventors: Erik B. Dam, Copenhagen (DK); Mads Nielsen, Dragør (DK); Arish Qazi, Brøndby Strand (DK); Martin Lillholm, Nivå (DK); Dan Richter Jørgenson, København (DK)

(73) Assignee: Synarc Inc, Newark, CA (US)

( * ) Notice: Subject to any disclaimer, the term of this patent is extended or adjusted under 35 U.S.C. 154(b) by 770 days.

(21) Appl. No.: 12/638,296

(22) Filed: Dec. 15, 2009

(65) Prior Publication Data

US 2010/0232671 A1 Sep. 16, 2010

Related U.S. Application Data

(60) Provisional application No. 61/203,094, filed on Dec. 17, 2008.

(51) Int. Cl.
*G06K 9/00* (2006.01)
*G01N 23/06* (2006.01)

(52) U.S. Cl.
USPC ............. 382/128; 382/132; 378/4; 378/51

(58) Field of Classification Search
USPC .................. 382/128, 132; 378/4, 37, 51
See application file for complete search history.

(56) References Cited

U.S. PATENT DOCUMENTS

| | | | |
|---|---|---|---|
| 6,754,374 B1* | 6/2004 | Miller et al. | 382/128 |
| 7,184,814 B2* | 2/2007 | Lang et al. | 600/416 |
| 7,239,908 B1* | 7/2007 | Alexander et al. | 600/427 |
| 7,796,791 B2* | 9/2010 | Tsougarakis et al. | 382/128 |
| 8,144,957 B2* | 3/2012 | Qu et al. | 382/128 |
| 8,280,126 B2* | 10/2012 | Dam et al. | 382/128 |

OTHER PUBLICATIONS

Andreasen, N.C., Flashman, L., Flaum, M., Arndt, S., Swayze, V., O'Leary, D.S., Ehrhardt, J.C., Yuh, W.T., 1994. Regional brain abnormalities in schizophrenia measured with magnetic resonance imaging. JAMA 272, 1763-1769.
Ashburner, J., Friston, K.J., 2000. Voxel-Based Morphometry—The Methods. NeuroImage 11, 805-821.
Baron, J.C., Chételat, G., Desgranges, B., Perchey, G., Landeau, B., de la Sayette, V., Eustache, F., 2001. In Vivo Mapping of Gray Matter Loss with Voxel-Based Morphometry in Mild Alzheimer's Disease. NeuroImage 14, 298-309.
Biswal, S., Hastie, T., Andriacchi, T.P., Bergman, G.A., Dillingham, M.F., Lang, P., 2002. Risk factors for progressive cartilage loss in the knee: a longitudinal magnetic resonance imaging study in forty-three patients. Arthritis and Rheumatism 46, 2884-2992.
Blumenkrantz, G., Lindsey, C.T., Dunn, T.C., Jin, H., Ries, M.D., Link, T.M., Steinbach, L.S., Majumdar, S., 2004. A pilot, two-year longitudinal study of the interrelationship between trabecular bone and articular cartilage in the osteoarthritic knee. Osteoarthritis and Cartilage 12, 997-1005.
Bookstein, F.L., 2001. "Voxel-Based Morphometry" Should Not Be Used with Imperfectly Registered Images. NeuroImage 14, 1454-1462.
Brinkman, B.H., Manduca, A., Robb, R.A., Resource, B.I., Rochester, M.N., 1998. Optimized homomorphic unsharp masking for MR grayscale inhomogeneity correction. IEEE Transactions on Medical Imaging 17, 161-171.

(Continued)

*Primary Examiner* — Alexander H Taningco
(74) *Attorney, Agent, or Firm* — Benjamin Aaron Adler

(57) ABSTRACT

A statistical framework for identifying regions of discrimination between two groups of imaged objects involves determining a weight map defining the regions of discrimination by minimizing the sample size required to discriminate the two groups in a numerical optimization scheme.

13 Claims, 7 Drawing Sheets

(56) References Cited

OTHER PUBLICATIONS

Chan, T.F., Vese, L.A., 2001. Active contours without edges. IEEE Transactions on Image Processing 10, 266-277.
Dam, E.B., Fletcher, P.T., Pizer, S.M., 2008. Automatic shape model building based on principal geodesic analysis bootstrapping. Medical Image Analysis 12, 136-151.
Dam, E.B., Folkesson, J., Pettersen, P.C., Christiansen, C., 2006. Automatic Cartilage Thickness Quantification using a Statistical Shape Model. MICCAI Joint Disease Workshop:Quantitative Automated Musculoskeletal Analysis, pp. 42-49.
Dam, E.B., Folkesson, J., Pettersen, P.C., Christiansen, C., 2007. Automatic morphometric cartilage quantification in the medial tibial plateau from MRI for osteoarthritis grading. Osteoarthritis and Cartilage 15, 808-818.
DeLong, E. R., DeLong, D. M., Clarke-Pearson, D. L., Sep. 1988. Comparing the areas under two or more correlated receiver operating characteristic curves: a nonparametric approach. Biometrics 44 (3), 837-845.
Dickerson, B.C., Goncharova, I., Sullivan, M.P., Forchetti, C., Wilson, R.S., Bennett, D.A., Beckett, L.A., deToledo-Morrell, L., 2001. MRI-derived entorhinal and hippocampal atrophy in incipient and very mild Alzheimer's disease. Neurobiology Aging, 22, 747-754.
Ding, C., Garnero P, Cicuttini F, Scott F, Cooley H, Jones G, 2005. Knee cartilage defects: association with early radiographic osteoarthritis, decreased cartilage volume, increased joint surface area and type II collagen breakdown. Osteoarthritis and Cartilage 13, 198-205.
Duda, R.O., Hart, P.E., Stork, D.G., 2001. Pattern classification. Wiley New York.
Eckstein, F., Cicuttini, F., Raynauld, J.P., Waterton, J.C., Peterfy, C., 2006. Magnetic resonance imaging (MRI) of articular cartilage in knee osteoarthritis (OA): morphological assessment. Osteoarthritis and Cartilage 14, A46-75.
Folkesson, J., Dam, E.B., Olsen, O.F., Pettersen, P.C., Christiansen, C., 2007. Segmenting Articular Cartilage Automatically Using a Voxel Classification Approach. IEEE Transactions on Medical Imaging 26, 106-115.
Freeborough, P.A., Fox, N.C., 1998. Modeling Brain Deformations in Alzheimer Disease by Fluid Registration of Serial 3D MR Images. Journal of Computer Assisted Tomography 22, 838-843.
Friedman, J.H., 1989. Regularized discriminant analysis. Journal of the American Statistical Association 84, 165-175.
Good, C.D., Johnsrude, I., Ashburner, J., Henson, R.N.A., Friston, K.J., Frackowiak, R.S.J., 2001. Cerebral Asymmetry and the Effects of Sex and Handedness on Brain Structure: A Voxel-Based Morphometric Analysis of 465 Normal Adult Human Brains. NeuroImage 14, 685-700.
Good, C.D., Scahill, R.I., Fox, N.C., Ashburner, J., Friston, K.J., Chan, D., Crum, W.R., Rossor, M.N., Frackowiak, R.S.J., 2002. Automatic Differentiation of Anatomical Patterns in the Human Brain: Validation with Studies of Degenerative Dementias. NeuroImage 17, 29-46.
Guillemaud, R., 1998. Uniformity Correction with Homomorphic Filtering on Region of Interest. International Conference on Image Processing. IEEE, pp. 872-875.
Hoerl, A.E., Kennard, R.W., 1970. Ridge regression: Biased estimation for nonorthogonal problems. Technometrics 12, 55-67.
Hohe, J., Faber, S., Muehlbauer, R., Reiser, M., Englmeier, K.H., Eckstein, F., 2002. Three-dimensional analysis and visualization of regional MR signal intensity distribution of articular cartilage. Medical Engineering and Physics 24, 219-227.
Holmes, A., Dec. 1994. Statistical issues in functional brain mapping. Ph.D. thesis, University of Glasgow.
Kelley, C.T., 1999. Iterative Methods for Optimization. Society for Industrial Mathematic.
Kellgren, J.H., Lawrence, J.S., 1957. Radiological assessment of osteoarthritis. Annals of the Rheumatic Diseases 16, 494-501.
Kirkwood, B. R., Sterne, J. A. C., 2003. Essential Medical Statistics (2nd Edition). Blackwell Publishing.
Lachin, J.M., 1981. Introduction to sample size determination and power analysis for clinical trials. Controlled Clinical Trials 2, 93-113.
Land, S.R., Friedman, J.H., 1997. Variable Fusion: A new adaptive signal regression method. Technical report 656, Department of Statistics, Carnegie Mellon University Pittsburg.
Mummery, C.J., Patterson, K., Price, C.J., Ashburner, J., Frackowiak, R.S.J., Hodges, J.R., 2000. A voxel-based morphometry study of semantic dementia: Relationship between temporal lobe atrophy and semantic memory. Annals of Neurology 47, 36-45.
Nichols, T. E., Holmes, A. P., 2002. Nonparametric permutation tests for functional neuroimaging: A primer with examples. Human Brain Mapping 15 (1), 1-25.
Nocedal, J., Wright, S.J., 1999. Numerical Optimization. Springer.
Pizer, S.M., Fletcher, P.T., Joshi, S., Thall, A., Chen, J.Z., Fridman, Y., Fritsch, D.S., Gash, A.G., Glotzer, J.M., Jiroutek, M.R., 2003. Deformable M-Reps for 3D Medical Image Segmentation. International Journal of Computer Vision 55, 85-106.
Polak, E., Ribiere, G., 1969. Note sur la convergence de methodes de directions conjuguees. Revue Francaise d'Informatique et de Recherche 16, 35-43.
Press, W.H., Teukolsky, S.A., Vetterling, W.T., Flannery, B.P., 2007. Numerical Recipes in C++.
Pruessner, J.C., Li, L.M., Serles, W., Pruessner, M., Collins, D.L., Kabani, N., Lupien, S., Evans, A.C., 2000. Volumetry of Hippocampus and Amygdala with High-resolution MRI and Three-dimensional Analysis Software: Minimizing the Discrepancies between Laboratories. Cerebral Cortex 10, 433-442.
Qazi, A.A., Dam, E.B., Loog, M., Nielsen, M., Lauze, F., Christiansen, C., 2008. A variational method for automatic localization of the most pathological ROI in the knee cartilage. Proceedings of SPIE Medical Imaging. SPIE, p. 69140T.
Qazi, A.A., et al., 2007a. Osteoarthritic Cartilage Is More Homogeneous Than Healthy Cartilage: Identification of a Superior Region of Interest Colocalized with a Major Risk Factor for Osteoarthritis. Academic Radiology 14, 1209-1220.
Qazi, A.A., Folkesson, J., Pettersen, P.C., Karsdal, M.A., Christiansen, C., Dam, E.B., 2007b. Separation of healthy and early osteoarthritis by automatic quantification of cartilage homogeneity. Osteoarthritis and Cartilage 15, 1199-1206.
Qvist, P., Bay-Jensen, A.C., Christiansen, C., Dam, E.B., Pastoureau, P., Karsdal, M.A., 2008. The disease modifying osteoarthritis drug (DMOAD): Is it in the horizon? (in press). Pharmacological Research.
Raz, N., Gunning-Dixon, F.M., Head, D., Dupuis, J.H., Acker, J.D., 1998. Neuroanatomical correlates of cognitive aging: evidence from structural magnetic resonance imaging. Neuropsychology 12, 95-114.
Sharma, L., Song, J., Felson, D.T., Cahue, S., Shamiyeh, E., Dunlop, D.D., 2001. The Role of Knee Alignment in Disease Progression and Functional Decline in Knee Osteoarthritis. JAMA 286, 188-195.
Tibshirani, R., 1996. Regression shrinkage and selection via the lasso. Journal of the Royal Statistical Society, Series B 58, 267-288.
Tibshirani, R., Saunders, M., Rosset, S., Zhu, J., Knight, K., 2005. Sparsity and smoothness via the fused lasso. Journal of the Royal Statistical Society Series B 67, 91-108.
West, M., 2003. Bayesian factor regression models in the "large p, small n" paradigm. Bayesian Statistics 7, 723-732.
Williams, T.G., Holmes, A.P., Waterton, J.C., Maciewicz, R.A., Nash, A.P., Taylor, C.J., 2006. Anatomically Equivalent Focal Regions Defined on the Bone Increases Precision when Measuring Cartilage Thickness from Knee MRI. MICCAI Joint Disease Workshop, pp. 25-32.
Williams, T. G., Taylor, C. J., Gao, Z., Waterton, J. C., 2003. Corresponding articular cartilage thickness measurements in the knee joint by modelling the underlying bone. In: MICCAI (2). pp. 480-487.
Wirth, W., Eckstein, F., 2008. A Technique for Regional Analysis of Femorotibial Cartilage Thickness Based on Quantitative Magnetic Resonance Imaging. IEEE Transactions on Medical Imaging 27, 737-744.
Wold, H., 1975. Soft modelling by latent variables: The non-linear iterative partial least squares (NIPALS) approach. Perspectives in Probability and Statistics, 117-142.
Xu, J., Kobayashi, S., Yamaguchi, S., Iijima, K., Okada, K., Yamashita, K., 2000. Gender Effects on Age-Related Changes in Brain Structure. American Journal of Neuroradiology 21, 112-118.
Yushkevich, P., et al., 2003. Feature selection for shape-based classification of biological objects. Information Processing in Medical Imaging. Springer, pp. 114-125.

\* cited by examiner

OPTIMISED REGION OF INTEREST SELECTION

RELATED APPLICATION

This application claims the benefit of U.S. provisional application Ser. No. 61/203,094, filed Dec. 17, 2008, the entire disclosure of which is incorporated herein by reference.

BACKGROUND OF THE INVENTION

The present invention relates to selecting a region of interest for use in extracting useful information from one or more images.

Identification of the most affected regions relating to physiological changes in a human organ can help in capturing the dynamics of the underlying pathology. For example, it is known that the articular cartilage undergoes morphometric changes during osteoarthritis (Eckstein et al., 2006). Characterization of the regions that best discriminate the healthy and the diseased can be used to reduce the sample size in clinical studies which is desirable since this translates into reduced costs and less patient burden. By studying the important regions it may also be possible to find clues about the pathophysiology of the disease.

Studies involving region of interest (ROI) analysis in human organs have been carried out by various researchers. For instance, the distribution of morphometric changes in the brain caused by genetic, environmental factors or various neurodegenerative diseases has been investigated extensively (Andreasen et al., 1994; Dickerson et al., 2001; Pruessner et al., 2000; Raz et al., 1998; Xu et al., 2000). Similar methods have been developed to analyze the articular cartilage. Hohe et al. observed signal intensity differences in pre-defined sub-regions of the patellar cartilage (Hohe et al., 2002). In a recent study, Wirth and Eckstein (Wirth and Eckstein, 2008) measured regional cartilage thickness in pre-defined anatomically based ROIs. In a longitudinal study, Blumenkrantz et al 2004. quantified changes in structural parameters of bone and cartilage by manually segmenting them in four anatomically meaningful sub-compartments (Blumenkrantz et al., 2004).

The majority of these studies rely on predefined ROIs. Specifically for brain atrophy measurements, ROI-based analysis is the current gold standard (Good et al., 2002). However, due to the manual segmentation task, these methods are labor-intensive and therefore typically focus on a limited number of ROIs. The time and cost involved in the manual segmentation task also makes it difficult to compare large subject groups. Another important problem is that often it is not obvious how to define the subregions that are optimal for the ROI analysis meaning that inter/intra observer reliability might be low.

In order to detect structural anomalies and other pathological differences reliably and accurately in an unbiased way, new techniques have been developed (Freeborough and Fox, 1998; Yushkevich et al., 2003). Voxel-Based Morphometry (VBM) is one such method. Proposed by Ashburner and Friston (Ashburner and Friston, 2000), VBM is increasingly being used to investigate differences in brain morphology between patient and control groups. VBM is widely being used as a tool to examine changes in brain morphometry during healthy aging (Good et al., 2001) or for various neurological conditions including Alzheimer's disease, and Semantic Dementia (Baron et al., 2001; Mummery et al., 2000). The output of the method is a probabilistic map which indicates regions of significant gray matter or white matter concentration differences. This map is usually computed using a statistical technique called statistical parametric mapping where parametric statistical models are assumed at each voxel. Holmes (1994) and Nichols and Holmes (2002) has suggested a alternative nonparametric method based on permutation test theory which they show is a viable alternative when the assumptions required for a parametric approach are not met.

Similar to the aim of VBM analysis, Dam et al. (Dam et al., 2006) computed 2D thickness maps of focal articular cartilage loss from knee MRI. and performed focal statistical tests to illustrate the local discriminative power of cartilage thickness measurements. This was done by a t-test at each position independently, and no attempt to reach a global discriminative (soft) region map was reported. These techniques, however, are based on voxel-by-voxel statistical comparisons where it is assumed that each voxel represents the same anatomical position across all the images, and Bookstein (Bookstein, 2001) pointed out that imperfect registration might lead to interpreting the results as a characteristic of the disease, while in fact this effect might be caused by misalignment of the images. Although smoothing can help alleviate mis-registration, the fundamental voxel correspondence problem still remains challenging. Moreover, the voxel-wise analysis ignores the neighborhood of a voxel which may underscore the anatomical relationship of a voxel.

Previously, we reported preliminary results on identification of regions of pathological differences in the articular cartilage (Qazi et al., 2008; Qazi et al., 2007a). Both methods employ a computationally intensive bootstrapping technique, based on voxel-wise analysis, to identify an ROI, which is further regularized by curve evolution methods. A drawback of these methods is that they do not consider prior information, such as the anatomical neighbourhood relationship of a particular voxel. Without prior information, the ROI problem is combinatorial and therefore, finding an optimal solution requires an exhaustive search, which makes the problem computationally intractable.

BRIEF SUMMARY OF THE INVENTION

The present invention now provides a method for identifying a region of interest (ROI) in an object from a set of similar images of different instances of a said object, said method comprising:
using a suitably programmed computer to compute a weighted map of a feature of said image in which the weight of said feature at each location in said map is calculated to minimise the sample size needed to distinguish a first group of said examples from a second said group, said ROI consisting of the set of locations in said map at which said feature has the highest weights.

Typically, the method comprises the preliminary steps of segmenting each image and spatially aligning the segmented images. The term 'segmentation' is used here in its conventional sense (in this field) of defining the outline of an object of interest (or of several objects of interest) within the image.

The weight of said feature at each location in the map may be restricted to positive values, as is done in the example given below. This may be most appropriate where meaningful changes in the chosen feature can only occur in one direction, e.g. where the feature is thickness of an object that is expected only to change by losing thickness. However, negative weights may be useful in other circumstances, for instance where the thickness of an object may increase in some locations and decrease in others as the object changes in a process that is to be detected. Especially in such cases it may be useful that the weight of said feature at each location in the map is the absolute value of a positive or negative weight.

Optionally, said calculation to minimise sample size is conducted by minimising for each location in said map a function indicative of sample size incorporating a penalty term which is a measure of the smoothness of the weighted map at said location, applied so as to penalise spatial variation in the feature and to provide spatial regularisation.

Additionally or alternatively, said calculation to minimise sample size is conducted by minimising for each location in said map a function indicative of sample size incorporating a penalisation term which provides sparsity in the weighting of said feature at locations in said map. The penalisation term is preferably substantially equivalent in its effect to a least absolute shrinkage and selection operator.

As exemplified below, said calculation to minimise sample size may be carried out by computation of a functional to produce results substantially equivalent to computing the functional:

$$\operatorname*{argmin}_{w_1} \sum_{j \in \{1,2\}} \frac{\sum_{k \in G_j} (\tilde{F}_j^k[W] - \tilde{\mu}_j)^2}{n_j} + \lambda \|\nabla W\|_1 + \eta \|W\|_1 \quad (7)$$

in which $\lambda$ and $\eta$ are optimised parameters, subject to the constraints $W \geq 0$, $\Sigma W = 1$.

The method can basically be applied to any task where two groups of imaged objects (where the images may be derived from two groups of subjects) are to be separated by means of measurements that are aggregated over a region. The physical locations constituting the region need not be contiguous. For these tasks, it will be potentially advantageous to optimize the region-of-interest (ROI) for the measurements. In the methods described herein, we specify the ROI by importance weights for each position in the images. Examples of fields suitable for the use of the methods of the invention include the following applications:
   ROI for cartilage quantification in the knee where the measurements may be volumetric (volume, thickness) and/or texture/quality-related (such as entropy) and may target monitoring of OA from MRI.
   ROI for bone quantification in the tibia and femur where the measurements may be quality-related (intensity, entropy, or more sophisticated texture measures) targeting monitoring of OA from MRI/radiographs.
   ROI for bone quantification in the spine where the measurements are quality-related (intensity, entropy, or more sophisticated texture measures) targeting monitoring of osteoporosis from CT/radiographs.
   ROI for breast cancer risk quantification from mammography images where the measurements are for instance the stripiness-related texture features described in WO2007/090892.
   ROI for aortic plaque quantification from radiographs of the aorta.

Thus, said images may be of biological objects. In certain preferred procedures, said images are of joint cartilages, bone, or brain, or are mammographic images. However, the same principles can be applied to inanimate objects, such as in detecting degradation in machine parts from X-rays or other structure revealing images.

The invention includes a computer programmed to conduct a computation for identifying a region of interest (ROI) in an object from an input comprising a set of similar images of different instances of a said object, said computation producing a weighted map of a feature of said image in which the weight of said feature at each location in said map is calculated to minimise the sample size needed to distinguish a first group of said examples from a second said group, said ROI consisting of the set of locations in said map at which said feature has the highest weights.

The invention further includes an instruction set for programming a computer to conduct a computation for identifying a region of interest (ROI) in an object from an input comprising a set of similar images of different instances of a said object, said computation producing a weighted map of a feature of said image in which the weight of said feature at each location in said map is calculated to minimise the sample size needed to distinguish a first group of said examples from a second said group, said ROI consisting of the set of locations in said map at which said feature has the highest weights.

BRIEF DESCRIPTION OF THE SEVERAL VIEWS OF THE DRAWINGS

The invention will be further described and illustrated with reference to the accompanying drawings, in which.

DETAILED DESCRIPTION OF THE INVENTION

Figure 1:
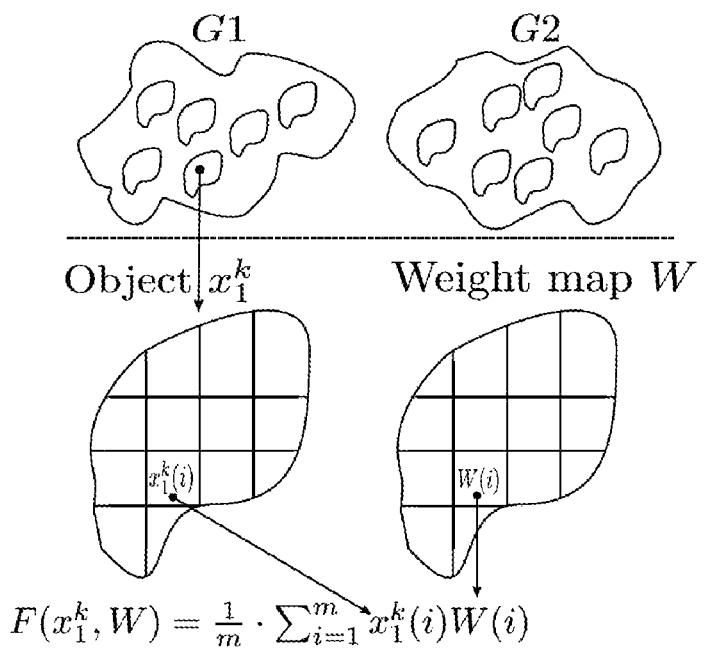
FIG. 1 illustrates the relationship between groups of objects $G_1$ and $G_2$ and a weight map W.

This invention utilises a novel methodology, having statistical underpinnings and incorporating prior knowledge of neighborhood relationships between features, for finding the most discriminative regions between patient groups. We formulate the problem in a smooth optimization scheme that minimizes the sample size required to discriminate two groups. For quantification methods that are to be used in clinical studies, the sample size is a crucial and specific end goal to optimize rather than more generic measures, such as classification accuracy. The sample size estimation determines the number of study participants and thereby the study feasibility and cost (and the patient burden). Given spatially normalized feature maps from objects belonging to two groups, the output of the method is a non-negative, real-valued weight map, where each weight reflects the local importance of the feature in separation of the two groups. We use the terms 'soft regions' or 'areas' to reflect the fact that regions are weighted by a real-valued map and not a binary map as in traditional ROI analysis.

The objective of the proposed method is to find the optimal weight map that minimises the sample size required to discriminate between two groups. Sample size reduction is a crucial and specific end goal whenever data is costly or hard to come by. For example, in clinical studies the sample size estimation determines the number of study participants and thereby the study feasibility and cost (and the patient burden). Secondly, the optimal weight map might aid in the clinical understanding of the biological objects being studied.

The problem is formulated as a optimization scheme that can incorporate most of the typical measures used for analysing biological objects; including shape and atrophy measures directed towards morphometric differences and textural measures directed towards structural alterations. Furthermore the choice of the sample-size formula can be interchanged in order to match the type of experiment being carried out.

We evaluate the performance of the framework below on both synthetic and clinical data from MRI images of the knee. To benchmark the performance of our method, we use Linear Discriminant Analysis (LDA), which is a standard, well-known, machine learning technique for determining suitable weights for a linear combination of features, discriminating two groups (Duda 2001).

While the method is described and illustrated herein chiefly in terms of dealing with medical image data, it is of general applicability.

Clinical research is designed to determine if a specific treatment has an effect. Usually this is done by dividing the subjects into two groups, the treatment and placebo and then measuring the effective differences in measurements of a biomarker for the two groups.

When conducting a clinical trial two types of errors must be considered: False positives and false negatives (Lachin, 1981). A false positive error is made when the results of a study indicate a difference between groups when in reality, there is no difference. The probability of false positives is the p-value, which is computed by a statistical test, such as a t-test. If the p-value is less than a threshold $\alpha$, typically 0.05, the result is said to be statistically significant, meaning that it is unlikely to have occurred by chance and that inferences about a treatment effect based purely on the observed data are likely therefore to be correct.

A false negative error occurs when the p-value fails to reach the required level of statistical significance, meaning that there is no observed difference between groups, when in fact there is. The probability of committing a false negative error is denoted by $\beta$, and its compliment $(1-\beta)$ is known as the statistical power. A common value for power is 0.8 meaning that there is an 80% probability that the difference will be detected.

An important aspect before any clinical study design is the estimation of the required sample size for detecting difference. This is crucial as a larger sample size implies more cost and time along with patient discomfort. The goal of sample size estimation is to reduce the chance of encountering false positives and false negatives, but the exact formula for determining the sample size is dependent on the type of experiment being carried out.

Assuming that we have normally distributed data, and that we want to demonstrate a significant difference between two proportions, the sample size formula can be written as in [Kirkwood and Sterne(2003)]:

$$N = \frac{\left(Z_\alpha \sqrt{\pi_1(1-\pi_1) + \pi_0(1-\pi_0)} + Z_\beta \sqrt{2\bar{\pi}(1-\bar{\pi})}\right)^2}{(\pi_0 - \pi_1)^2},$$

where N is the sample size, $\pi_0$ and $\pi_1$ are the proportions and $\bar{\pi}$ is the mean of $\pi_0$ and $\pi_1$. Given the desired levels of $\alpha$ and $\beta$, the values of $Z_\alpha$ and $Z_\beta$ are the probability cut-off points along the x-axis of a standard normal probability distribution.

As an example, suppose that the standard procedure for diagnosing a certain disease has an accuracy of 75%. A new method is then developed and a study is proposed in order to determine whether or not it has a better accuracy. To compensate for the increased cost and patient burden of the new procedure, it is decided that it must have an accuracy of at least to be considered significantly better than the standard procedure. A significance criterion of 0.05 and a power of 0.9 is chosen and thus $\pi_0$=0.75, $\pi_1$=0.9, $\bar{\pi}$=0.825, $Z_\alpha$=1.960 and $Z_\beta$=1.282. Using the equation given above, this yields a sample size of N=132 meaning that 132 patients should be enrolled in each group.

A common goal of an experiment is to show a significant difference between two means. Still assuming normally distributed data, the sample size N can be calculated as (Lachin, 1981)

$$N = \left(\frac{(\sigma_1^2 + \sigma_2^2)(Z_\alpha + Z_\beta)^2}{(\mu_1 - \mu_2)^2}\right) = k \frac{(\sigma_1^2 + \sigma_2^2)}{(\mu_1 - \mu_2)^2} \quad (1)$$

Where $\mu_1$ and $\mu_2$ are group means, $\sigma_1^2$ and $\sigma_2^2$ are group variances and we define $k=(Z_\alpha+Z_\beta)^2$. Equation (1) implies that both large differences between groups and smaller variances will reduce the number of participants needed in a trial. The difference between the means is the minimum difference that we would like to be able to detect, and is chosen before the trial starts. On the other hand, the variance in the data is something that must be estimated—something that is often done using the past experience of a trained expert. However, if previously collected data exist, this can also be used to estimate the variances and in some cases even help to lower the sample size. Consider the situation where the biomarker chosen for a study can be measured in many different ways. By examining the known data, it might be possible to find the best way to measure the biomarker, meaning the one that minimizes the variances or increases the differences between the mean, which in turn will lower the sample size needed for the trial.

In the rest of this example, we shall describe a general framework for minimizing the sample size needed for a study, using this approach. As an example we shall use the sample size expression given by equation (1), but sample size expressions for other types of experiments, could also have been used. The only requirement is that the chosen sample size expression can be formulated as a functional that can be minimized.

This section describes the framework for determination of the discriminative weight map (DWM). First we formulate finding the DWM as an optimization problem and afterwards present the specifics related to implementation and evaluation of the generalization ability of the method. Then we describe how the framework relates to the LDA method, which is used for benchmarking the performance of the invented technique.

First therefore we describe the determination of a Discriminative Weight Map by Sample Size Optimization (SSO). The method assumes that imaged biological objects belonging to two groups have been segmented and are spatially aligned. Additionally, the measure on which the DWM is being computed is known. We note that our framework: 1) requires that the measure is related to the pathology of the disease in question, and 2) having regard to the use of Equation (1) to represent the sample size expression assumes the measure to be normally distributed.

The input to the framework is a collection of anatomically aligned objects that fall in one of the two groups:

$$G_1 = \{x_1^1, x_1^2, \ldots, x_1^{n_1}\}$$

and $$G_2 = \{x_2^1, x_2^2, \ldots, x_2^{n_2}\}$$

of size $\eta_1$ and $\eta_2$ respectively.

Each object consists of a fixed number of regions m, each represented by a 1-dimensional feature calculated on that region. In the simplest case a region is just a pixel or a voxel and the feature could be the grey-level intensity. Regions can also be defined as any connected set of pixels/voxels, as long as they remain spatially aligned across objects. This setup is illustrated in FIG. 1, where the top part of the figure shows the two groups G1 and G2, each containing a number of objects. The middle part shows one object from the G1 group and the weight map W, both divided into m spatially aligned regions. The equation shows how the measurement for the object is calculated.

Formally, we denote the m-dimensional feature vector that represents each object by $$x_j^k \in \mathbb{R}^m$$

where each entry in the feature vector $$x_j^k(i)$$

where $x_j^k(i)(i \in \{1 \ldots m\})$ is the 1-dimensional feature calculated in the i'th region of the object.

Now let the relative importance of feature i, measured at a given region, be represented by weight $W(i)$, and let $$F(W, x_j^k) \in \mathbb{R}$$

be the inner product of $x_j^k$ and W normalized by the number of regions m:

$$F(x_j^k, W) = \frac{\langle x_j^k, W \rangle}{m}$$

in short denoted $F_j^k[W]$.

This is the value of a specific object, after being weighted by W, and we call this number the 'measurement' for an object (see bottom part of FIG. 1). The objective of the framework is to find the m-dimensional weight map that minimizes the sample size, given by equation (1).

The discriminative weight map (DWM), represented by W, could be defined as a standard region-of-interest (ROI), where $W(i)=1$ if i is in the ROI and $W(i)=0$ otherwise. For many problems, in order to find the optimal solution, an exhaustive combinatorial search from the $2^m$ possible subsets of W is required, where m is the number of entries in W. To avoid this problem we propose to relax the domain of W to R which allows us to define the solution as a smooth optimization problem where variational techniques will typically allow tractable optimization. Negative weights will however often not be anatomically interpretable and we choose to restrict W to $[0, \infty)$. Further reasons for limiting W to non-negative values are discussed later in this section.

As stated above, we assume that the measurements in the two groups are normally distributed, so that $F_j^k[W](j \in \{1,2\})$ can be viewed as samples drawn from:

$$F_1[W] = X_1 \sim N(\mu_1, \sigma_1)$$

and $$F_2[W] = X_2 \sim N(\mu_2, \sigma_2)$$

The sample size necessary to distinguish $X_1$ from $X_2$, given by equation (1), is a function of both the means and the variances. However by making a linear transformation of $X_1$ and $X_2$ we can fix the mean values and simplify the expression so it only depends on the variances. This is accomplished by making the transformation:

$$\tilde{X}_1 = a_1 X_1 + a_0 \text{ and } \tilde{X}_3 = a_1 X_2 + a_0 \quad (2)$$

where $a_1 = \frac{1}{\mu_1 - \mu_2}$ and $a_0 = \frac{\mu_2}{\mu_2 - \mu_1}$ so that $\tilde{\mu}_1 = 1$ and $\tilde{\mu}_2 = 0$.

Equation (1) can now be written as:

$$N \propto \tilde{\sigma}_1^2 + \tilde{\sigma}_2^2 \quad (3)$$

where $\tilde{\sigma}_1 = |a_1|\sigma_1$ and $\tilde{\sigma}_2 = |a_1|\sigma_2$.

Note that k in equation (1) is a constant meaning that the optimization is independent of the choice of $\alpha$ and $\beta$.

Subsequently we have $\tilde{F} = a_1 F + a_0$ which means that the sample size can be found using:

$$N \propto \sum_{j \in \{1,2\}} \frac{\sum_{k \in G_j} (\tilde{F}_j^k[W] - \tilde{\mu}_j)^2}{n_j} \quad (4)$$

where j indicates the two groups. We can formulate the problem as a minimiser for (4)

(4)

$$\underset{W}{\operatorname{argmin}} \sum_{j \in \{1,2\}} \frac{\sum_{k \in G_j} (\tilde{F}_j^k[W] - \tilde{\mu}_j)^2}{n_j} \quad (5)$$

where $\tilde{F}_j^k[W]$ is the outcome measure for subject k.

This formulation has an inherent drawback: The functional leads to good separation between groups but does not incorporate prior knowledge about the DWM. In biological settings, the anatomical position of a feature plays an important role and it is likely that neighbouring locations are highly correlated. We also prefer a more regularized DWM, which will be less prone to over-fitting and likely more anatomically plausible.

To exploit the spatial nature of the features and to regularize we add a penalty term of the form $\|\nabla W\|_p$. By $\nabla$, we denote the gradient operator (or in the discrete setting a local difference operator), such that $\|\nabla W\|_p$ is a measure of the variation or roughness of W. We select $p=1$, resulting the $|\nabla W|_1$, the L1-norm of the gradient of the weight map. This term is known as zero-order variable fusion and was proposed by Land and Friedman (Land and Friedman, 1997). It has also been adapted for image segmentation by (Chan and Vese, 2001). The effect of this term is to shrink the solution towards being piece-wise constant. Land and Friedman showed that when compared to other smoothing functionals, such as spline regression, variable fusion produces simpler interpretable solutions and is effective in case of sharp features (Land and Friedman, 1997). An alternate term could be $|\nabla W|_2$, however, the term does not produce sparsity in the differences of the weights.

Adding the regularization term $|\nabla W|_1$ to (5) yields:

$$\underset{w,a_0,a_1}{\operatorname{argmin}} \sum_{j \in \{1,2\}} \frac{\sum_{k \in G_j} \left(\tilde{F}_j^k[W] - \tilde{\mu}_j\right)^2}{n_j} + \lambda \|\nabla W\|_1 \quad (6)$$

The parameter λ influences the extent of spatial regularization. Increasing values of λ will in turn increase the smoothness of the DWM. Assuming that the feature maps relate meaningful anatomical neighbourhood relationships, smoothness reflects the local correlation.

Next we wish to add a sparsity term in order to get a more compact model that is likely to generalize better. A simpler model will also be easier to interpret and probably make more sense from a biological point of view. This goal can be achieved by assigning zero weight to redundant regions, represented by the 1-dimensional features, which will cause them to be filtered out.

Another motivation for doing this is that the 'region space' might typically be much larger than the number of output variables. This is also known as the "large p, small n" paradigm (West, 2003). Such problems may not yield a unique solution but can be solved by eliminating redundant regions.

On its own, the penalty term in is not sufficient since it only encourages sparsity in the differences of the region weights, but not on the regions themselves. There have been methods proposed for regularization of the solution space, such as ridge regression (Hoerl and Kennard, 1970) and partial least squares (Wold, 1975). A disadvantage of such methods is that the resulting solution space is not very sparse. Proposed by Tibshirani (Tibshirani, 1996), the least absolute shrinkage and selection operator (LASSO) is similar to ridge regression except that it selects the important features while discarding the rest. Therefore, it produces coefficients that are exactly 0, yielding a sparse solution that may be more easily interpretable.

Adding the $L_1$-regularization term to functional (6)

$$\underset{w_1}{\operatorname{argmin}} \sum_{j \in \{1,2\}} \frac{\sum_{k \in G_j} \left(\tilde{F}_j^k[W] - \tilde{\mu}_j\right)^2}{n_j} + \lambda \|\nabla W\|_1 + \eta \|W\|_1 \quad (7)$$

where the parameter $f$ controls the sparsity of the solution map W. The regularization terms in our functional are similar to the fused LASSO (Tibshirani et al., 2005), which was applied to 1-dimensional gene expression data.

Furthermore, we impose two conditions on the map W. First, we fix its sum to a constant number; the weights are relative which makes them invariant to scaling. To avoid a drift in the optimization scheme and to attain numerical stability we scale the sum of weights to a constant number. Secondly, we restrict the weights to being non-negative. For many problems, negative weight will not be anatomically interpretable and for some features, they might not even be mathematically meaningful (e.g. a weighted computation of texture measures could lead to intensity histograms with negative counts for some intensities). Finally, because we use the $L_1$ norm in the regularisation terms, negative weights will cause the optimization problem to become non-differentiable. Therefore, to ensure generality, we restrict to non-negative weights.

The functional (7) changes to a constrained optimization of the form $$\underset{w}{\operatorname{argmin}} \sum_{j \in \{1,2\}} \frac{\sum_{k \in G_j} \left(\tilde{F}_j^k[W] - \tilde{\mu}_j\right)^2}{n_j} + \lambda \|\nabla W\|_1 + \eta \|W\|_1 \quad (8)$$

subject to $W \geq 0, \sum W = 1$

Optimizing functional (8) will yield a positive, unit sum weight map that identifies the most discriminative regions between two groups of biological objects.

The functional in (8) could, most likely, be minimized using a specialized method, such as quadratic programming. The form of (8) is, however, derived using the particular choice of the sample size expression given in equation and can be considered to be a special case. In order to keep the framework as general as possible, we therefore chose to utilize a smooth gradient based optimization technique. .A number of methods exist, such as the steepest descent, Newton method and quasi-Newton, for a review see Nocedal. Because of its efficiency in storage requirements (does not require computation of the Hessian matrix) and convergence rate, non-linear conjugate gradient (CG) descent was chosen. The method is an iterative scheme of the form $W_{i+1} = W_i + a_i d_i$, where $d_i$ is the search direction computed using the Polak-Ribere update rule Polak and $a_i > 0$ is the step size determined using line search. We implement the line search using Brent's method (Press 2002).

The functional (8) is bound by the non-negativity constraint on the weights. In order to optimize it as a bound constrained problem we utilize the gradient projection method (Kelley 1999). Given the current iterate, the weights are projected and scaled to the desired range, in order to form the new iterate. The projection method simply replaces all negative weights with zeros and the scaling is done by dividing each weight with the sum of the weights.

A uniform weight map (UWM) is used for initialization, meaning that the weights are assigned a constant value such that their sum is one. We experimented with random initializations of the weights and observed that the functional converged to the same minimum but the convergence rate was much slower.

Note that the regularization term, $\eta \|W\|_1$, in (7) is non-differentiable at W=0, but since the weights are non-negative, smooth gradient based optimization techniques can still be utilised.

Since the values of $\alpha_0$ and $\alpha_1$, used to calculate $\tilde{F}$ in each iteration, are directly dependent on the weight map W, the optimization of functional (8) is a two-step process: First, we determine the values of $\alpha_0$ and $\alpha_1$ using the current estimate of the weight map and the equations in (2). Next, we use these parameters to estimate $\tilde{F}$ followed by computing the regularization terms which finally leads to estimation of the functional.

The parameters λ and η have impact on the characteristics of the weight map and therefore their choice is crucial to the generalization ability of the DWM. Their values are selected by first dividing the data into three sets of equal size. Then, given an initial guess of λ and η, these parameters are optimized by minimizing the sample size on set 2. During optimization, for each specific value of λ and η, the sample size on set 2 is computed by evaluating the weight map estimated by optimizing functional (8) on set 1. Therefore, there are two different optimizations taking place; optimization of λ and η and optimization of the weight map. Both optimizations are carried out using the non-linear optimization framework presented above.

Since the proper order of magnitude for λ and η is initially unknown, there is a risk that the optimization will be very slow or even get stuck in a local minima. In order to have stable estimates, multiple initializations of λ and η are therefore used. We have found that initial values for $\lambda \epsilon [0, 0.2]$ and $\eta \epsilon [0, 0.5]$ led to the best results. The final choice of parameters correspond to the ones that gives the minimum sample size on set 2. When the DWM corresponding to the optimal parameters, λ and η, have been found, it is then evaluated on set 3 using the sample size expression in equation (1). The reduction of sample size on set 3, when compared to the sample size computed using a uniform weight map, indicates whether the method is successful. The individual steps needed to optimize the DWM can be seen in algorithm 1.

---

Algorithm 1 Finding the DWM.

---

Split the data in 3 sets; S1, S2 and S3
Initialize guess vectors for λ and η
for each combination of λ and η do
    Initialize W to a uniform map
    while Improvement > Threshold do
        Optimize W on S1 using the current values of λ and η
        Optimize λ and η on S2 using current W
    end while
    Store optimal values of λ and η
end for
Choose λ and η corresponding to the minimum function value
Use these parameters to optimize W on S1
Calculate the sample size on S3 using the optimal W.

---

However, an alternative algorithm is as follows:

---

Algorithm 1a: Finding the optimal DWM

---

Split the data in 3 sets: S1, S2, and S3
Initialize guess vectors for λ and η
for each element in the λ guess vector
    for each element in the η guess vector
        optimize λ and η for N on S2, by computing DWM on S1
        store the optimized parameters and the function value
    end
end
    choose λ and η corresponding to the minimum function value
    use these parameters and compute the DWM on S1
    evaluate the resultant optimal DWM on S3

---

LDA is a well-known scheme for feature extraction and dimensionality reduction (Duda 2000). LDA projects the data onto a lower-dimensional vector space such that the ratio of the between-group distance to the within-group distance is maximized, leading to good discrimination between the two groups. In Fisher LDA, the criterion function $$J(W) = \frac{(\mu_1 - \mu_2)^2}{\sigma_1^2 + \sigma_2^2}$$

is maximized in order to find the optimal weights W.

In order to benchmark our framework, we compare our results with those obtained using the standard Fisher LDA as well as results from a regularized version, where the covariance matrix Σ' is computed as:

$$\Sigma' = (1-r)\Sigma + rI$$

Here Σ is the pooled covariance matrix i.e. the average covariance matrix, I is the identity matrix, and $r \epsilon [0,1]$ is the regularization parameter. The regularization parameter is optimized by the same technique that determines the optimal parameters of our method i.e. by using set 1 and set 2 for training.

Note that the formulation of the Fisher LDA closely resembles the sample size expression in equation (1), on which our method is based. There are, however, important differences between LDA and the proposed framework, the first being the regularization terms in (7) and the second the non-negativity constraint in (8). Furthermore, the resemblance is due to our choice of the sample size expression. As mentioned above, different formulae can be used depending on the type of study that is being conducted, and in most cases these formulae are not similar to LDA.

In order to investigate whether the framework can detect regions of differences and is able to generalize beyond the training data, we start with an investigation of synthetic examples. The data consists of 2-dimensional, 10×10 pixel, feature maps, belonging to one of two different groups, denoted by G1 and G2, with 200 features maps in each group. The G1 maps are constructed by randomly sampling features from a Gaussian distribution with mean 1. The G2 maps are similar in construction except that for two predefined regions the features are sampled from a Gaussian distribution with mean 0. These regions, illustrated in FIG. 2 panel a, represent the "ground truth" weight map.

The feature maps are subjected to additive Gaussian noise. The intensity of the noise is varied to simulate different levels of signal-to-noise ratio (SNR), which is a measure of the quality of image acquisition and feature extraction. We define SNR as the ratio of the mean difference between groups divided by the standard deviation σ of the noise, 1/σ in our case. As an example, FIG. 2, panel b illustrates a G2 feature map at an SNR of 0.4. The feature maps are subjected to Algorithm 1 to validate if the method is able to reconstruct the ground truth DWM, as in FIG. 2, panel a, and if it is able to generalize as well.

In order to get a robust estimate of the DWM the algorithm is executed a number of times, each time with a different randomization of the sets. This bootstrap evaluation was done 100 times for the synthetic data and 150 times for the clinical data described in section 5. In the following sections all sample sizes and DWMs reported are the median results of these runs. The median was chosen, since it is less affected by outliers than the mean.

To calculate the sample size given by equation (1), the significance criterion α was set to 0.05 and the statistical power β was set to 0.8.

Table 1 lists the median sample sizes over 100 randomised trials of the algorithm at different SNR levels.

TABLE 1

| | Set 1 | | | | | Set 2 | | | | | Set 3 | | | | |
|---|---|---|---|---|---|---|---|---|---|---|---|---|---|---|---|
| SNR | 2.0 | 1.0 | 0.6 | 0.4 | 0.4† | 2.0 | 1.0 | 0.6 | 0.4 | 0.4† | 2.0 | 1.0 | 0.6 | 0.4 | 0.4† |
| UWM | 1.74 | 1.3 | 52 | 300 | 312 | 1.71 | 14 | 53 | 297 | 322 | 1.73 | 14 | 47 | 319 | 322 |
| GT | 0.42 | 3.5 | 15 | 95 | 96 | 0.43 | 3.6 | 15 | 98 | 99 | 0.42 | 3.6 | 14 | 96 | 97 |
| DWM | 0.39 | 2.9 | 10 | 28 | 50 | 0.45 | 4.0 | 21 | 274 | 176 | 0.45*** | 4.1*** | 19*** | 263* | 185*** |
| LDA | 0.31 | 2.4 | 8 | 18 | 39 | 0.58 | 5.3 | 28 | 515 | 238 | 0.57*** | 5.4*** | 26*** | 582 | 257** |
| R-LDA | 0.42 | 3.0 | 10 | 19 | 40 | 0.44 | 4.2 | 23 | 436 | 229 | 0.44*** | 4.3*** | 22*** | 477 | 250** |

Figure 2:
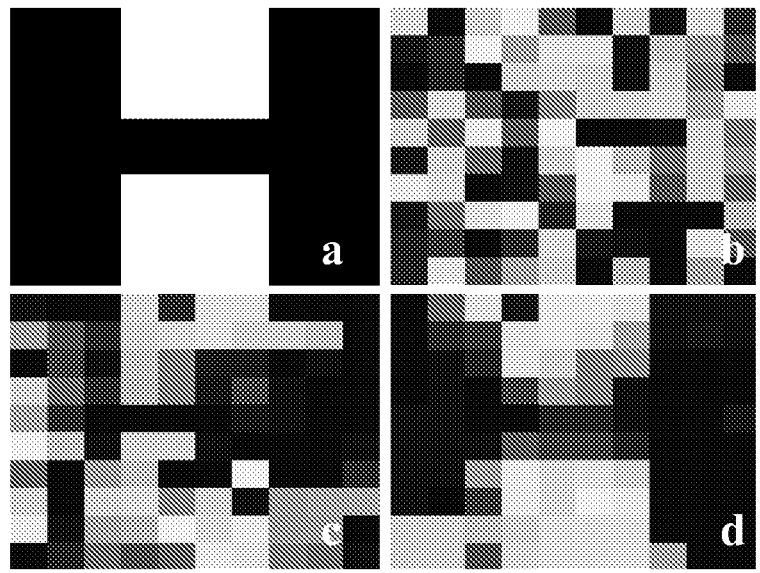
FIG. 2 shows in panels (a) to (d) the results of applying the method of the invention to synthetic data.

Each group consisted of 200 objects but in columns marked by a †, this number was increased to 500 objects. GT is ground truth sample size, calculated with the weights map set to the binary ground truth, as shown in FIG. 2, panel a. UWM is sample size computed from a uniform weight map, DWM is the result of the method for sample size optimization of the invention and R-LDA is regularized LDA. p-values are marked by asterisks:*p<0.05, p<0.001 and *p<1×10$^{-15}$.

For each SNR the corresponding sample sizes for the uniform weight map (UWM), the ground truth weight map (GT), and the DWM computed from our method, are listed for all 3 sets. For set 1, the sample size estimates for the DWM are lower and differ considerably from the ones obtained using the ground truth, which implies over-fitting. For set 2 and set 3 the sample sizes from the DWM are slightly higher than the ground truth sample sizes, however, more importantly the behaviour of sample size estimates for both sets is similar. This implies that apart from a reasonable reconstruction of the DWM, the method is able to generalize.

At a low SNR of 0.4, however, the sample sizes from the DWM are quite different when compared to those of the ground truth. This suggests that the amount of available data was not enough to discriminate between the groups and we therefore experimented by increasing the number of objects in each group from 200 to 500. As can be seen in last column of Table 1, and in FIG. 2, panel c, this increase in data enabled the method to reduce the difference in sample sizes between the ground truth and DWM.

To appreciate the method we have also listed the sample sizes computed from a uniform weight map (UWM). These sample sizes are computed based on a weight map with equal weights for all the features. In order to quantify whether the reduction in sample size was significant we utilized the Wilcoxon Rank Sum test to compute p-values, testing the null hypothesis that there is no difference between the sample size from the UWM and the sample size from the DWM.

We can see that when compared to the sample sizes for the UWM, the sample sizes for the DWM are significantly lower. This implies that the method is able to find a DWM that leads to a better separation of the groups, and is also able to generalize.

The table also lists the sample sizes, computed using the LDA and the regularized LDA (R-LDA) methods. At a high SNR, the performance of R-LDA is similar to our method with the LDA giving slightly worse results. When the SNR decreases (0.6 and lower) the performance of LDA goes down rapidly and at an SNR of 0.4 the sample sizes for both the LDA and the R-LDA are higher than the results obtained by our method. Moreover, at this SNR, the sample sizes for both the LDA and the R-LDA, are higher than those obtained for the UWM, when we only use 200 objects in each group.

The second evaluation of the proposed method is on clinical MR data of the tibial cartilage, which has been used in the study of Osteoarthritis (OA). OA is a degenerative joint disease that is characterized by degeneration of the articular cartilage (Ding, 2005) for which, at present, there is no effective cure and treatment is directed towards symptom relief.

Below, we outline the methods for alignment and feature quantification of the cartilages. These are the pre-requisites to the framework. Then we present the results from our method and a comparison of these with those obtained from LDA.

A total of 286 knees (both left and right) from 159 subjects (82 men and 77 women, age from 21 to 81 years old) were available (after exclusion of knees used for training the cartilage segmentation method). The medial tibial compartments of the knees were examined and quantified by radiography and MRI. Using radiographs (X-rays) these knees were classified by a radiologist as 0-4 on the semiquantitative Kellgren-Lawrence (KL) (Kellgren and Lawrence, 1957) index where KL 0 represents healthy and KL 4 severe OA. The number of subjects within each group was: KL0 (144), KL1 (88), KL2 (29), KL3 (24), and KL4 (1). MRI Image acquisition was done on an Esaote C-Scan low field 0.18T scanner, acquiring a Turbo 3D T1 sequence (40° flip angle, $T_R$=50 ms, $T_E$=16 ms).

The scan resolution was 0.7 mm×0.7 mm with a slice thickness between 0.7-0.9 mm. The dimensions of the scans were 256×256 pixels with around 110 slices. For more details refer to (Dam et al., 2007). For reproducibility evaluation the MR protocol was repeated a week later on 31 knees.

The cartilages were segmented based on a supervised voxel classification scheme using a kNN classifier (Folkesson et al., 2007). The sheets were augmented by an anatomical coordinate system by fitting a deformable m-rep shape model to the segmented articular cartilage (Dam et al., 2008). The m-rep represents an object by a set of medial atoms, each associated with a position, radius, and directions to the boundary (Pfizer et al., 2003). Alternatively, an approach similar to [Williams et al. (2003) Williams, Taylor, Gao, and Waterton] could equally well have been used to define the cartilage coordinate system. They implicitly define the cartilage correspondence by a coordinate system of the underlying bone. For both approaches, missing cartilage is treated as having zero thickness.

In our experiments, we evaluated three different types of features. The first two relate to structural changes during the disease. For the articular cartilage these are the Cartilage Volume (Folkesson et al., 2007), which determines overall cartilage loss, and Cartilage Thickness (Dam et al., 2006), which may be particularly advantageous for the analysis of conditions related to focal cartilage loss. To be invariant to the size of a subjects' joint, both measures were normalized by width of the tibial plateau.

The third measure relates to structure of biochemical changes undergoing in the cartilage. This is Cartilage Homogeneity (Qazi et al., 2007b) which relates to intrinsic changes in the articular cartilage water distribution, as visualized by MRI. Homogeneity was quantified by calculating the entropy which is a way of measuring the randomness present in the data. The computation of homogeneity involves signal intensities therefore the scans were corrected for any intensity bias by a method proposed by Guillemaud (Guillemaud, 1998), which filters the image using homomorphic unsharp masking (Brinkmann et al., 1998). Entropy is a global measure computed from the intensity histogram. Therefore, instead of applying the weight map to the feature map, the weights were instead applied to the local histogram, computed from the local intensity values.

Figure 3:
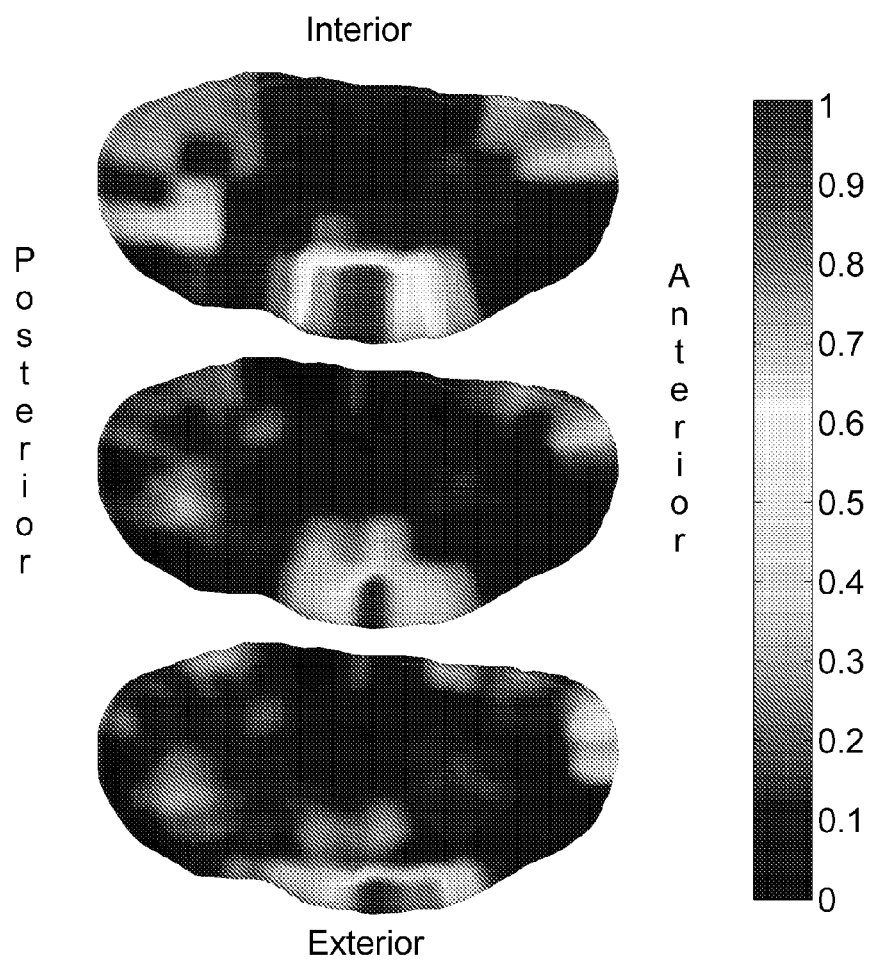
FIG. 3 shows in three images cartilage homogeneity weight maps for a knee cartilage estimated with different sub-region sizes.

To quantify feature maps each cartilage was divided in sub-regions, defined by the shape model, which extended from the surface of the cartilage to the cartilage-bone interface. The measurements were then computed for each sub-region and projected onto a 2-dimensional representation of the cartilage. This resulted in a 2D feature map of measurements, where each sub-region provided a feature. The sub-region resolution was chosen to be 10×20. Experimentation with different resolutions revealed that both the resultant DWM and sample sizes were not sensitive to choice of the resolution, unless there are very few regions. FIG. 3 illustrates the weight maps estimated with different sub-region sizes using homogeneity as feature. In the figure, 'Interior' is defined to be towards the knee center. The resolution and sample sizes are: (top) 5×10, N=66. (middle) 10×20, N=68. (bottom) 20×40, N=63. For visualization, the logarithm of the weights is used and have been scaled to be between 0-1.

The resulting sample sizes are quite similar. Thus, at a lower resolution we can reduce the computation time significantly without affecting accuracy. We found the resolution 10×20 to be a good trade-off between speed and accurate determination of the DWM.

The 286 knees were divided randomly in 3 sets consisting of 95, 95 and 96 knees respectively, and processed by Algorithm 1. The knees were divided in two groups, based on the KL index: healthy (KL=0) and diseased (KL>0). Considering the biological variation of the sets and to have robust estimate of the DWM, 150 runs of Algorithm 1 were executed, each time with a different randomization of the sets. This was done for each of the three feature types and Table 2 lists the median sample sizes computed from the UWM and from the DWM.

TABLE 2

| Feature | Method | Set 1 Sample Size | Set 2 Sample size | Set 3 Sample size | Set 3 p-value | Set 3 % reduction |
|---|---|---|---|---|---|---|
| Homogeneity | UWM | 64 | 77 | 70 | | |
|  | DWM | 24 | 52 | 68 | 0.53 | 3 |
| Volume | UWM | 190 | 181 | 197 | | |
|  | DWM | 58 | 102 | 137 | $3.2 \cdot 10^{-4}$ | 30 |
| Thickness | UWM | 279 | 253 | 302 | | |
|  | DWM | 49 | 97 | 126 | $5.1 \cdot 10^{-16}$ | 58 |
|  | LDA | 6 | 449 | 326 | NA | −8 |
|  | R-LDA | 29 | 140 | 383 | NA | −27 |

Note that since most studies on regional measurements of cartilage focus on cartilage thickness, e.g. Eckstein, Williams, Wirth, results from the LDA methods are only reported for this feature.

In Table 2 UWM is the sample size, computed from a weight map with equal weights for all features and DWM is the sample size computed using the method of the invention.

Figure 4:
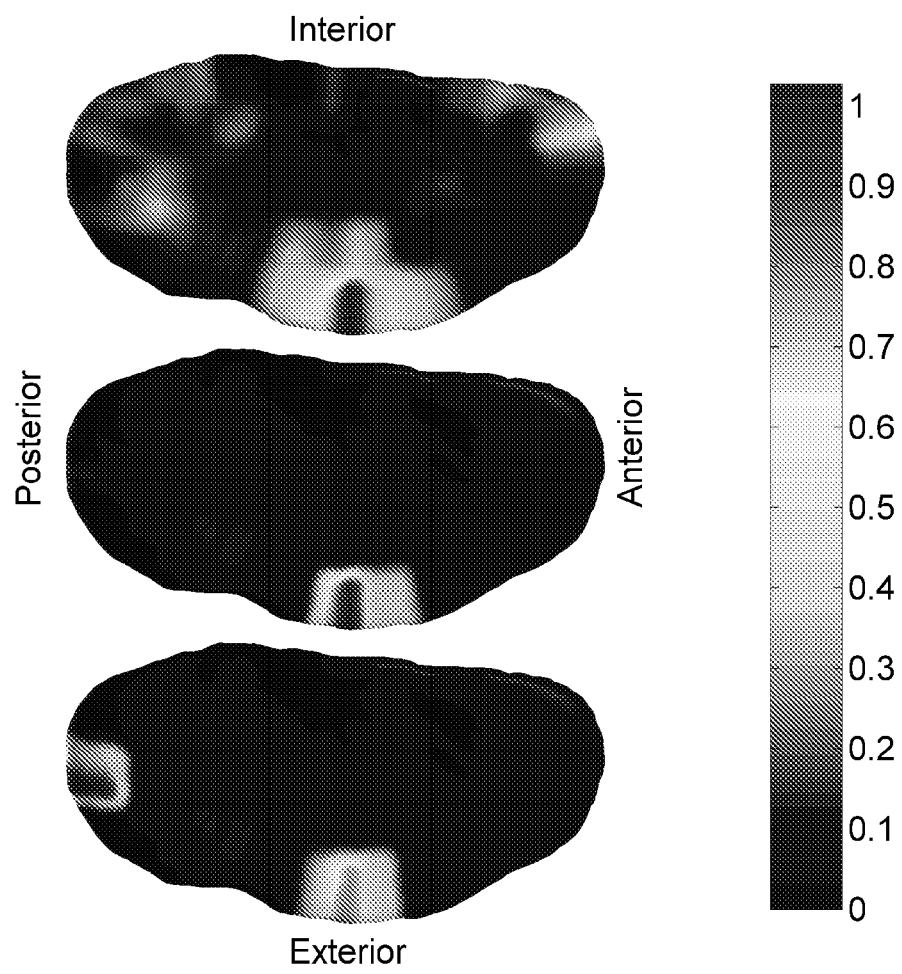
FIG. 4 shows three weight maps for a knee cartilage giving the median DWM, projected in an example of a medial tibial cartilage based on different features: (top) Cartilage Homogeneity (middle) Cartilage Volume (bottom) Cartilage Thickness.

The average reduction in sample sizes for the validation set, set 3, for the DWM was: homogeneity 3%, volume 30% and thickness 58%. In order to quantify whether the reduction in sample size was significant for set 3, we again utilized the Wilcoxon Rank Sum test to compute p-values, listed in Table 2. The p-values indicate significant differences for the volume and thickness features, which implies that the reduction in sample size, achieved from our method, is consistent and stable throughout the 150 randomized trials. The three percent sample size reduction achieved when using homogeneity as a feature, was not significant. FIG. 4 illustrates the median DWM in a sample cartilage. The median DWM, projected onto an example of a medial tibial cartilage. Homogeneity (top), Volume (middle) and Thickness (bottom). 'Interior' is defined to be towards the knee center. For visualization, the logarithm of the weights is used and have been scaled to be between 0-1.

Figure 5:
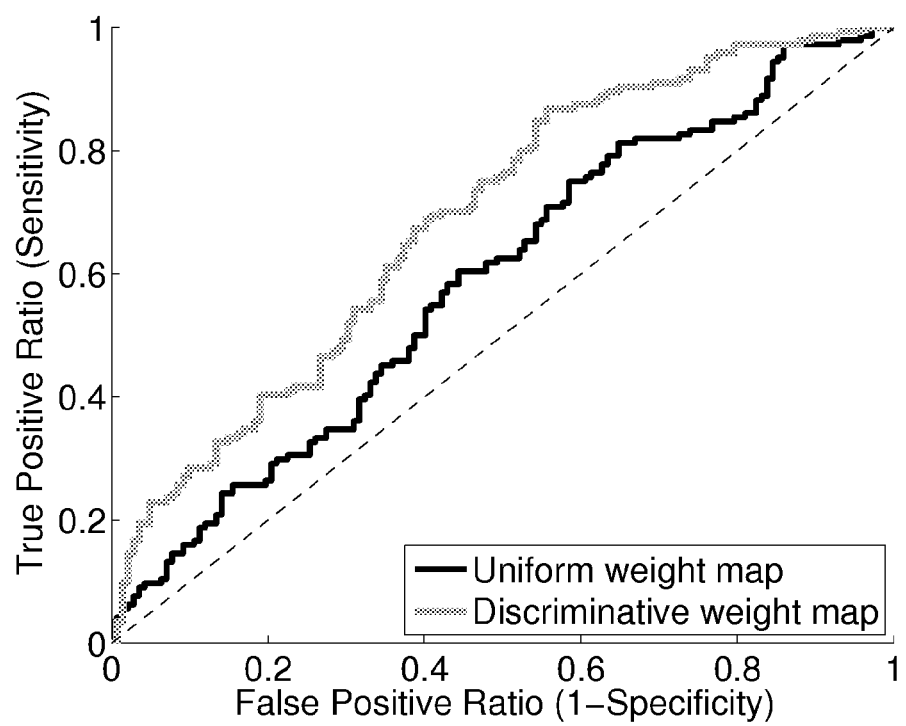
FIG. 5 ROC curves obtained according to the invention.

We also calculated the AUC for the thickness feature using a uniform weight map and the median DWM from the 150 trials of the method. This was done by calculating the measurement values for all 286 knees in the dataset. The two ROC curves are shown in FIG. 5 where we see ROC curves for the thickness feature using a uniform weight map and the median DWM from the method of the invention. Area under the curve is 0.59 and 0.69 respectively, so using the median DWM gives better results than using a uniform weight map. The DeLong test DeLong show that the differences between the curves are significant with a p-value of $2 \cdot 10^{-5}$.

Table 3 shows the reproducibility results for the different measures, quantified from the UWM, and the DWM from our method.

TABLE 3

| Measure | UWM (CV %) | DWM (CV %) |
|---|---|---|
| Homogeneity | 1.6 | 1.9 |
| Volume | 8.6 | 11.1 |
| Thickness | 3.2 | 4.4 |

The reproducibility of the optimal DWM was assessed using the test-retest root mean squared Coefficient of Variation (RMS-CV %) on the pairs of measurements performed on the 31 scan-rescan MRI pairs.

Figure 6A:
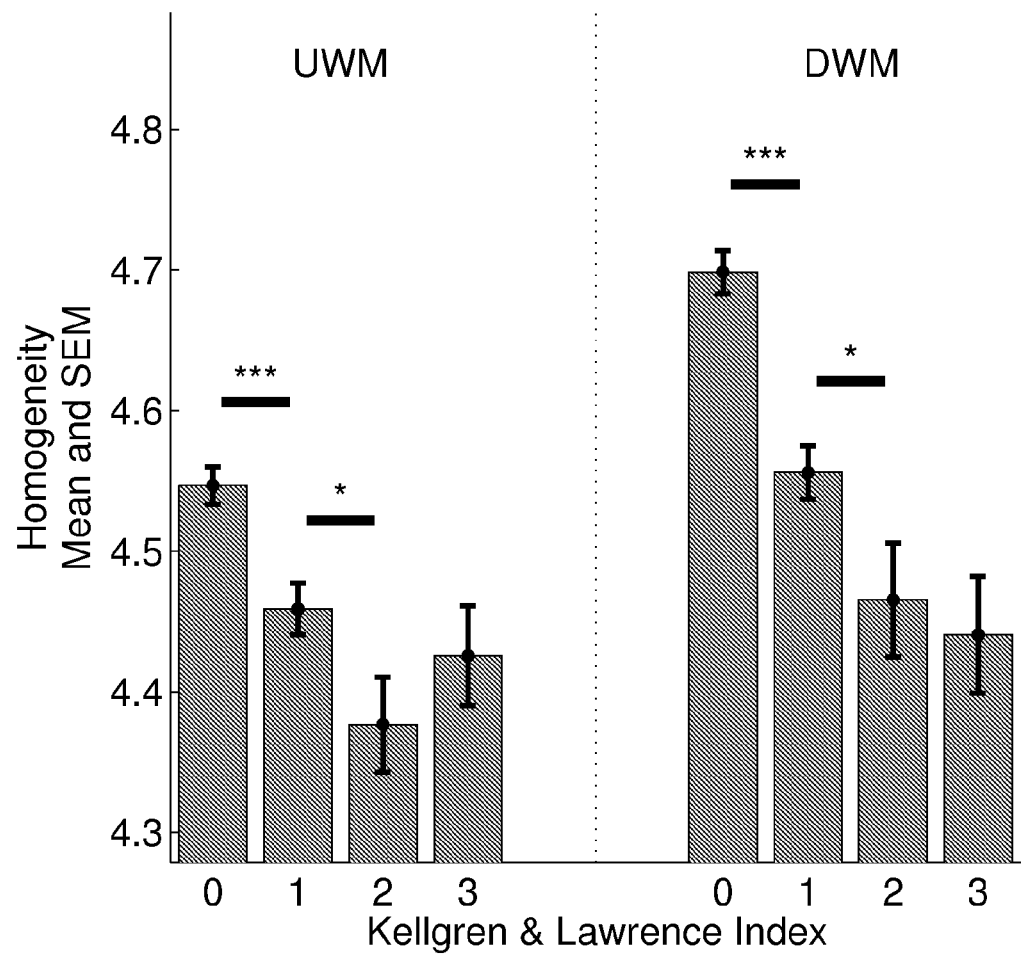
FIG. 6A, FIG. 6B and FIG. 6C show respectively charts comparing performance of the 3 measures (A) Cartilage Homogeneity, (B) Cartilage Volume, and (C) Cartilage Thickness.
Figure 6B:
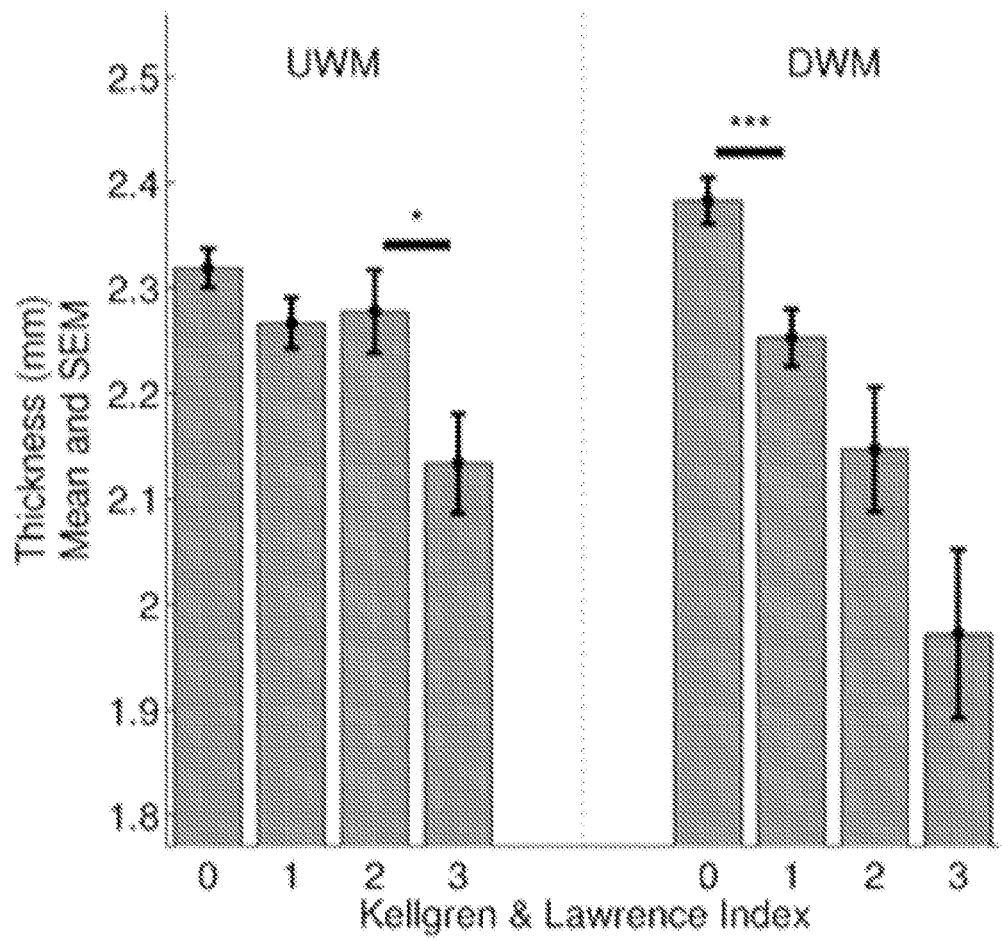
Figure 6C:
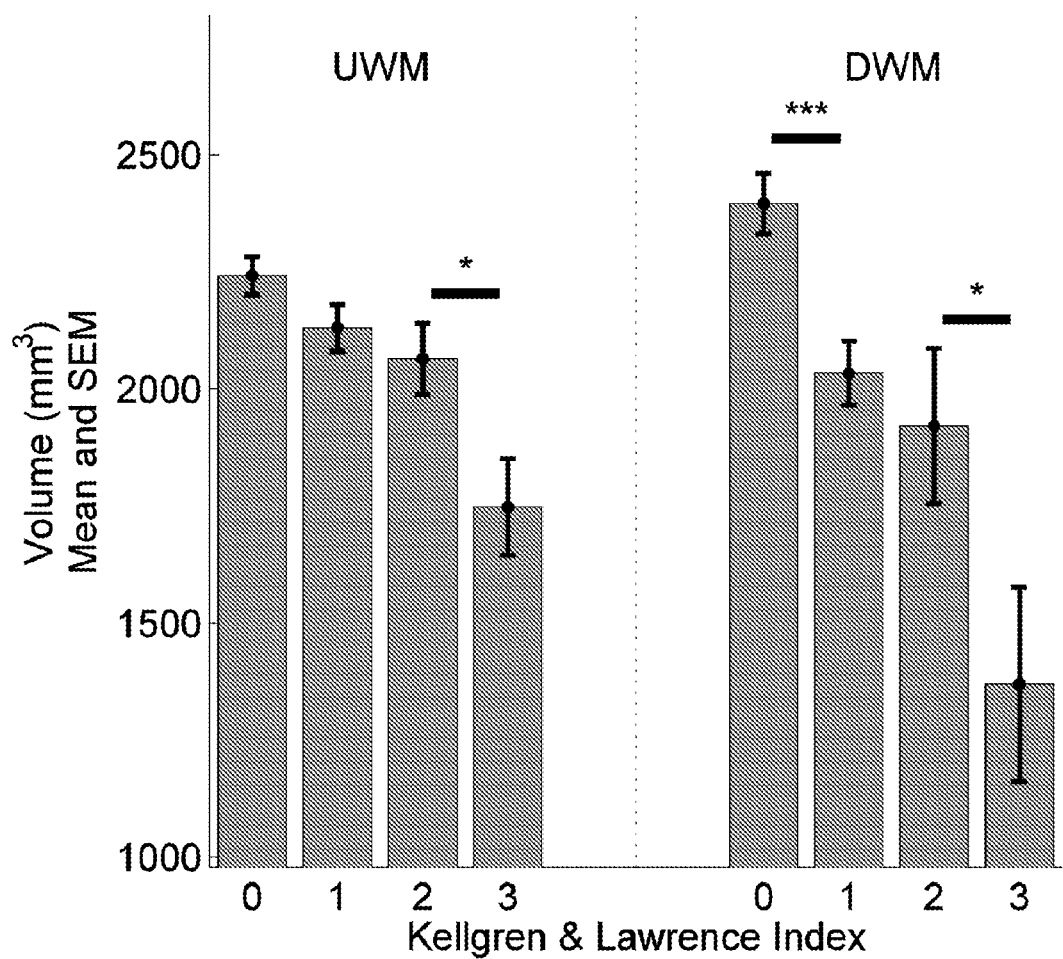

FIGS. 6A, 6B and 6C, shows the mean and standard error of the mean (SEM) of the three feature types for the different KL sub-groups comparing the performance of the three feature types quantified from the UWM and the DWM. FIG. 6A relates to Homogeneity, FIG. 6B relates to Volume and FIG. 6C to Thickness. p-values are marked by asterisks: *p<0.05, p<0.01 and *p<0.001. For all features, better separation and monotonous progression is achieved by the DWM.

Analogously to the evaluation on the synthetic data, we compare the performance of the method to LDA and regularized LDA. Since most studies on regional measurements of cartilage focus on cartilage thickness (e.g. (Eckstein et al., 2006; Williams et al., 2006; Wirth and Eckstein, 2008)), we limit the comparison to this measure.

Table 2 lists the results obtained which show that both the standard LDA and the regularized LDA fail to generalize beyond the training data. On set 3 both methods perform worse than using a uniform weight map. This trend was also seen when testing on synthetic data with a low SNR and few data samples. This indicates that the method of the invention is better at coping with noise, which could either be due to the regularization terms or due to the non-negativity constraint on the weight map. To test this further, we implemented a version of our framework that only uses the L2-norm of the weight map $\|W\|_2$ for regularization, which except for the non-negativity constraint, makes it resemble the R-LDA method. In general, this version of the framework turned out to give better results than R-LDA method, especially on the real data and on synthetic data at a low SNR. This limited version of the framework was, however, consistently outperformed by the fully regularized version, although only by a small margin. For example, the limited version of the framework achieved a median sample size of 142 on the clinical data using the thickness feature, whereas the number was 126 for the fully regularized version. This leads us to believe that the good performance of the method of the invention, when compared to the R-LDA method, is in large part due to the non-negativity constraint on the weight map and to some extent to the use of the regularization terms.

On synthetic data, the results above demonstrate that the described method is able to generalize to unseen data (Table 1), and is also able to approximate the ground truth DWM well (FIG. 2, panel c). Additionally, we have compared the results to those obtained from the LDA. These results (Table 1) show that when compared to the LDA as well as the regularized LDA, the described method is more robust and provides performance closer to the ground truth, particularly for data with few samples relative to the signal-to-noise ratio.

It is further demonstrated that the method is able to localize regions in the articular cartilage using both morphometric features (FIG. 4). It has been shown that the resultant regions are able to generalize (Table 2), lead to significant reductions in sample size (Table 2), and are reproducible (Table 3). The reduction in sample size is highly desirable whenever data is difficult or costly to collect, e.g. for clinical studies since it will have a positive impact on the cost of the study. However, the method of the invention found no statistically significant reduction in sample size for the textural feature Homogeneity. This demonstrates that the method will not force a positive result when the data does not support one.

Additionally, the measures from the optimal DWM are able to achieve a better quantification of the progression of the disease (FIGS. 6A-C). For instance, for the UWM, both volume (FIG. 6B) and thickness (FIG. 6C) measures are not able to statistically separate the two groups of KL 0 and KL 1. The measurements, computed from the DWM, however, lead to a statistically significant (p<0.001) separation. Similarly, the progression of the measures, computed from the optimal DWM, with respect to the KL scores, follow a more natural, decreasing pattern as the disease progresses.

The results obtained from the evaluation of the method on clinical data are better than the results obtained from the LDA (Table 2). The increased performance may be attributed to the non-negativity constraint and the regularization terms, specifically the spatial regularization terms in the functional (8).

Furthermore, the effect of the regularization terms can be clearly seen in FIG. 4, which shows that the DWMs are sparse but at the same time reflect the local correlation between regions.

The sensitivity of the method to mis-registration has not been evaluated. Imperfect registration might lead to false estimations of atrophy, in case of structural features. However, our results would only improve from better alignment.

The anatomical plausibility of the resulting DWMs from the knee MRI data requires insight into cartilage degeneration. Previous studies have shown that during OA the cartilage is not affected uniformly and it is believed that cartilage lesions located in the central weight-bearing region of the medial compartment are prone to more rapid cartilage loss Biswal 2002. The DWMs (FIG. 4) are not corresponding to the central, load-bearing part of the cartilage for any of the measures. Rather they focus on the interior periphery of the cartilage. We believe that the areas outlined may be a result of biomechanical factors affecting the cartilage. One such factor that has found to play an important role in OA progression is knee alignment, calculated as the hip-knee-ankle angle. Malalignment of the knee influences the neutral collinear state by shifting the load-bearing axis which in turn affects the load distribution of the knee. Previously, it has been shown by Sharma et al. (2001) that the mechanical affects of alignment on load distribution eventually leads to OA progression in different compartments of the knee. Results from our study support the importance of biomechanical factors in the etiology of the disease. The fact that the method found no statistically significant improvement for the homogeneity marker may on the contrary indicate that the processes during the very early stage of OA where the interior structural is affected has a different etiology. It seems plausible that such very early changes could be resulting from generalized biochemical processes rather than from focal biomechanical stress Qvist 2008.

Recently, [Williams et al. (2006)] showed that reproducibility of cartilage thickness can be increased by excluding the edges of the cartilage sheet. However, since the pathological regions are likely most difficult to measure precisely, optimizing for precision may indirectly exclude important areas. As the results show, our resulting discriminative regions focus on the periphery (FIG. 4) and as shown in Table 3, the increased discrimination is not achieved through improved precision. This supports that rather than finding a region where measurements are stable, the discriminative regions are highlighting areas of pathology. However, these results should be validated on more than one population before they can be used as basis for the power analysis for a clinical study or for hypothesis generation regarding the pathogenesis of OA.

In the future, we plan to evaluate our method on longitudinal data of the knee. This means that the computed optimal DWM will present the regions of most pathological changes over time. This may aid in understanding the pattern of pathogenesis and the etiology of the disease.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

REFERENCES

Andreasen, N. C., Flashman, L., Flaum, M., Arndt, S., Swayze, V., O'Leary, D. S., Ehrhardt, J. C., Yuh, W. T., 1994. Regional brain abnormalities in schizophrenia measured with magnetic resonance imaging. JAMA 272, 1763-1769.

Ashburner, J., Friston, K. J., 2000. Voxel-Based Morphometry—The Methods. NeuroImage 11, 805-821.

Baron, J. C., Chételat, G., Desgranges, B., Perchey, G., Landeau, B., de la Sayette, V., Eustache, F., 2001. In Vivo Mapping of Gray Matter Loss with Voxel-Based Morphometry in Mild Alzheimer's Disease. NeuroImage 14, 298-309.

Biswal, S., Hastie, T., Andriacchi, T. P., Bergman, G. A., Dillingham, M. F., Lang, P., 2002. Risk factors for progressive cartilage loss in the knee: a longitudinal magnetic resonance imaging study in forty-three patients. Arthritis and Rheumatism 46, 2884-2992.

Blumenkrantz, G., Lindsey, C. T., Dunn, T. C., Jin, H., Ries, M. D., Link, T. M., Steinbach, L. S., Majumdar, S., 2004. A pilot, two-year longitudinal study of the interrelationship between trabecular bone and articular cartilage in the osteoarthritic knee. Osteoarthritis and Cartilage 12, 997-1005.

Bookstein, F. L., 2001. "Voxel-Based Morphometry" Should Not Be Used with Imperfectly Registered Images. NeuroImage 14, 1454-1462.

Brinkmann, B. H., Manduca, A., Robb, R. A., Resource, B. I., Rochester, M. N., 1998. Optimized homomorphic unsharp masking for MR grayscale inhomogeneity correction. IEEE Transactions on Medical Imaging 17, 161-171.

Chan, T. F., Vese, L. A., 2001. Active contours without edges. IEEE Transactions on Image Processing 10, 266-277.

Dam, E. B., Fletcher, P. T., Pizer, S. M., 2008. Automatic shape model building based on principal geodesic analysis bootstrapping. Medical Image Analysis 12, 136-151.

Dam, E. B., Folkesson, J., Pettersen, P. C., Christiansen, C., 2006. Automatic Cartilage Thickness Quantification using a Statistical Shape Model. MICCAI Joint Disease Workshop:Quantitative Automated Musculoskeletal Analysis, pp. 42-49.

Dam, E. B., Folkesson, J., Pettersen, P. C., Christiansen, C., 2007. Automatic morphometric cartilage quantification in the medial tibial plateau from MRI for osteoarthritis grading. Osteoarthritis and Cartilage 15, 808-818.

DeLong, E. R., DeLong, D. M., Clarke-Pearson, D. L., September 1988. Comparing the areas under two or more correlated receiver operating characteristic curves: a nonparametric approach. Biometrics 44 (3), 837-845.

Dickerson, B. C., Goncharova, I., Sullivan, M. P., Forchetti, C., Wilson, R. S., Bennett, D. A., Beckett, L. A., deToledo-Morrell, L., 2001. MRI-derived entorhinal and hippocampal atrophy in incipient and very mild Alzheimer's disease. Neurobiology Aging 22, 747-754.

Ding, C., Garnero P, Cicuttini F, Scott F, Cooley H, Jones G, 2005. Knee cartilage defects: association with early radiographic osteoarthritis, decreased cartilage volume, increased joint surface area and type II collagen breakdown. Osteoarthritis and Cartilage 13, 198-205.

Duda, R. O., Hart, P. E., Stork, D. G., 2001. Pattern classification. Wiley New York.

Eckstein, F., Cicuttini, F., Raynauld, J. P., Waterton, J. C., Peterfy, C., 2006. Magnetic resonance imaging (MRI) of articular cartilage in knee osteoarthritis (OA): morphological assessment. Osteoarthritis and Cartilage 14, A46-75.

Folkesson, J., Dam, E. B., Olsen, O. F., Pettersen, P. C., Christiansen, C., 2007. Segmenting Articular Cartilage Automatically Using a Voxel Classification Approach. IEEE Transactions on Medical Imaging 26, 106-115.

Freeborough, P. A., Fox, N. C., 1998. Modeling Brain Deformations in Alzheimer Disease by Fluid Registration of Serial 3D MR Images. Journal of Computer Assisted Tomography 22, 838-843.

Friedman, J. H., 1989. Regularized discriminant analysis. Journal of the American Statistical Association 84, 165-175.

Good, C. D., Johnsrude, I., Ashburner, J., Henson, R. N. A., Friston, K. J., Frackowiak, R. S. J., 2001. Cerebral Asymmetry and the Effects of Sex and Handedness on Brain Structure: A Voxel-Based Morphometric Analysis of 465 Normal Adult Human Brains. NeuroImage 14, 685-700.

Good, C. D., Scahill, R. I., Fox, N. C., Ashburner, J., Friston, K. J., Chan, D., Crum, W. R., Rossor, M. N., Frackowiak, R. S. J., 2002. Automatic Differentiation of Anatomical Patterns in the Human Brain: Validation with Studies of Degenerative Dementias. NeuroImage 17, 29-46.

Guillemaud, R., 1998. Uniformity Correction with Homomorphic Filtering on Region of Interest. International Conference on Image Processing. IEEE, pp. 872-875.

Hoerl, A. E., Kennard, R. W., 1970. Ridge regression: Biased estimation for nonorthogonal problems. Technometrics 12, 55-67.

Hohe, J., Faber, S., Muehlbauer, R., Reiser, M., Englmeier, K. H., Eckstein, F., 2002. Three-dimensional analysis and visualization of regional MR signal intensity distribution of articular cartilage. Medical Engineering and Physics 24, 219-227.

Holmes, A., December 1994. Statistical issues in functional brain mapping. Ph.D. thesis, University of Glasgow Kelley, C. T., 1999. Iterative Methods for Optimization. Society for Industrial Mathematics.

Kellgren, J. H., Lawrence, J. S., 1957. Radiological assessment of osteoarthritis. Annals of the Rheumatic Diseases 16, 494-501.

Kirkwood, B. R., Sterne, J. A. C., 2003. Essential Medical Statistics (2nd Edition). Blackwell Publishing.

Lachin, J. M., 1981. Introduction to sample size determination and power analysis for clinical trials. Controlled Clinical Trials 2, 93-113.

Land, S. R., Friedman, J. H., 1997. Variable Fusion: A new adaptive signal regression method. Technical report 656, Department of Statistics, Carnegie Mellon University Pittsburg.

Mummery, C. J., Patterson, K., Price, C. J., Ashburner, J., Frackowiak, R. S. J., Hodges, J. R., 2000. A voxel-based morphometry study of semantic dementia: Relationship between temporal lobe atrophy and semantic memory. Annals of Neurology 47, 36-45.

Nichols, T. E., Holmes, A. P., 2002. Nonparametric permutation tests for functional neuroimaging: A primer with examples. Human Brain Mapping 15 (1), 1-25.

Nocedal, J., Wright, S. J., 1999. Numerical Optimization. Springer.

Pizer, S. M., Fletcher, P. T., Joshi, S., Thall, A., Chen, J. Z., Fridman, Y., Fritsch, D. S., Gash, A. G., Glotzer, J. M., Jiroutek, M. R., 2003. Deformable M-Reps for 3D Medical Image Segmentation. International Journal of Computer Vision 55, 85-106.

Polak, E., Ribiere, G., 1969. Note sur la convergence de methodes de directions conjuguees. Revue Francaise d'Informatique et de Recherche 16, 35-43.

Press, W. H., Teukolsky, S. A., Vetterling, W. T., Flannery, B. P., 2007. Numerical Recipes in C++.

Pruessner, J. C., Li, L. M., Serles, W., Pruessner, M., Collins, D. L., Kabani, N., Lupien, S., Evans, A. C., 2000. Volumetry of Hippocampus and Amygdala with High-resolution MRI and Three-dimensional Analysis Software: Minimizing the Discrepancies between Laboratories. Cerebral Cortex 10, 433-442.

Qazi, A. A., Dam, E. B., Loog, M., Nielsen, M., Lauze, F., Christiansen, C., 2008. A variational method for automatic localization of the most pathological ROI in the knee cartilage. Proceedings of SPIE Medical Imaging. SPIE, p. 69140T.

Qazi, A. A., Dam, E. B., Nielsen, M., Karsdal, M. A., Pettersen, P. C., Christiansen, C., 2007a. Osteoarthritic Cartilage Is More Homogeneous Than Healthy Cartilage Identification of a Superior Region of Interest Colocalized With a Major Risk Factor for Osteoarthritis. Academic Radiology 14, 1209-1220.

Qazi, A. A., Folkesson, J., Pettersen, P. C., Karsdal, M. A., Christiansen, C., Dam, E. B., 2007b. Separation of healthy and early osteoarthritis by automatic quantification of cartilage homogeneity. Osteoarthritis and Cartilage 15, 1199-1206.

Qvist, P., Bay-Jensen, A. C., Christiansen, C., Dam, E. B., Pastoureau, P., Karsdal, M. A., 2008. The disease modifying osteoarthritis drug (DMOAD): Is it in the horizon? (in press). Pharmacological Research.

Raz, N., Gunning-Dixon, F. M., Head, D., Dupuis, J. H., Acker, J. D., 1998. Neuroanatomical correlates of cognitive aging: evidence from structural magnetic resonance imaging. Neuropsychology 12, 95-114.

Sharma, L., Song, J., Felson, D. T., Cahue, S., Shamiyeh, E., Dunlop, D. D., 2001. The Role of Knee Alignment in Disease Progression and Functional Decline in Knee Osteoarthritis. JAMA 286, 188-195.

Tibshirani, R., 1996. Regression shrinkage and selection via the lasso. Journal of the Royal Statistical Society, Series B 58, 267-288.

Tibshirani, R., Saunders, M., Rosset, S., Zhu, J., Knight, K., 2005. Sparsity and smoothness via the fused lasso. Journal of the Royal Statistical Society Series B 67, 91-108.

West, M., 2003. Bayesian factor regression models in the "large p, small n" paradigm. Bayesian Statistics 7, 723-732.

Williams, T. G., Holmes, A. P., Waterton, J. C., Maciewicz, R. A., Nash, A. P., Taylor, C. J., 2006. Anatomically Equivalent Focal Regions Defined on the Bone Increases Precision when Measuring Cartilage Thickness from Knee MRI. MICCAI Joint Disease Workshop, pp. 25-32.

Williams, T. G., Taylor, C. J., Gao, Z., Waterton, J. C., 2003. Corresponding articular cartilage thickness measurements in the knee joint by modelling the underlying bone. In: MICCAI (2). pp. 480-487.

Wirth, W., Eckstein, F., 2008. A Technique for Regional Analysis of Femorotibial Cartilage Thickness Based on Quantitative Magnetic Resonance Imaging. IEEE Transactions on Medical Imaging 27, 737-744.

Wold, H., 1975. Soft modelling by latent variables: The nonlinear iterative partial least squares (NIPALS) approach. Perspectives in Probability and Statistics, 117-142.

Xu, J., Kobayashi, S., Yamaguchi, S., Iijima, K., Okada, K., Yamashita, K., 2000. Gender Effects on Age-Related Changes in Brain Structure. American Journal of Neuroradiology 21, 112-118.

Yushkevich, P., Joshi, S., Pizer, S. M., Csernansky, J. G., Wang, L. E., 2003. Feature selection for shape-based classification of biological objects. Information Processing in Medical Imaging. Springer, pp. 114-125.

Incorporation by Reference

The contents of all references (including literature references, issued patents, published patent applications, and co-pending patent applications) cited throughout this application are hereby expressly incorporated herein in their entireties by reference.

Equivalents

Those skilled in the art will recognize, or be able to ascertain using no more than routine experimentation, many equivalents of the specific embodiments of the invention described herein. Such equivalents are intended to be encompassed by the following claims.

The invention claimed is:

1. A method for identifying a region of interest (ROI) in an object from a set of similar images of different instances of said object, said method comprising:
inputting the set of similar images into a computer suitably programmed with an algorithm for calculating optimised weights;
calculating an initial weight map of a feature of said images,
applying said algorithm to the initial weight map to calculate optimised weights of said feature at locations in said map to minimise the sample size needed to distinguish a first group of said instances from a second group of said instances, thereby producing a weighted map, and
identifying said ROI as consisting of a set of locations in said weighted map at which said feature has the highest optimised weights.

2. A method as claimed in claim 1, comprising the preliminary steps of segmenting each image and spatially aligning the segmented images.

3. A method as claimed in claim 1, wherein the optimised weight of said feature at each location in the map is restricted to positive values.

4. A method as claimed in claim 1, wherein the optimised weight of said feature at each location in the map is the absolute value of a positive or negative weight.

5. A method as claimed in claim 1, said calculation to minimise sample size is conducted by minimising for each location in said map a function indicative of sample size incorporating a penalty term which is a measure of the smoothness of the weighted map at said location.

6. A method as claimed in claim 1, said calculation to minimise sample size is conducted by minimising for each location in said map a function indicative of sample size incorporating a penalisation term which provides sparsity in the weighting of said feature at locations in said map.

7. A method as claimed in claim 6, wherein said penalisation term is substantially equivalent in its effect to a least absolute shrinkage and selection operator.

8. A method as claimed in claim 4, wherein said calculation to minimise sample size is carried out by computation of a functional to produce results substantially equivalent to computing the functional:

$$\operatorname*{argmin}_{w_1} \sum_{j \in \{1,2\}} \frac{\sum_{k \in G_j} (\tilde{F}_j^k[W] - \tilde{\mu}_j)^2}{n_j} + \lambda \|\nabla W\|_1 + \eta \|W\|_1 \qquad (7)$$

in which $\lambda$ and $\eta$ are optimised parameters, subject to the constraints, $W \geq 0$, $\Sigma W = 1$.

9. A method as claimed in claim 1, wherein said images are of biological objects.

10. A method as claimed in claim 9, wherein said images are of joint cartilages, bone, or brain, or are mammographic images.

11. A method as claimed in claim 9, wherein said images are of joint cartilages and said weighted map is a map weighting locations in said cartilages at which thickness or volume of the cartilage distinguishes cartilages impaired by arthritis from non-imparied cartilages.

12. A computer programmed for identifying a region of interest (ROI) in an object via instructions to:

receive an input comprising a set of similar images of different instances of said object, calculate an initial weight map of a feature of said images, apply an algorithm to the initial weight map to calculate optimised weights of said feature at locations in said map to produce a weighted map of said images in which the weights of said feature at the locations in said map are calculated to minimise the sample size needed to distinguish a first group of said instances from a second group of said instances, and identify said ROI as consisting of a set of locations in said weighted map at which said feature has the highest optimised weights.

13. An instruction set on a non-transitory computer readable storage medium for programming a computer to:

receive an input comprising a set of similar images of different instances of an object, calculate an initial weight map of a feature of said images, apply an algorithm to said initial weight map to calculate optimised weights of said feature at locations in said map to produce a weighted map of said images in which the weights of said feature at the locations in said map are calculated to minimise the sample size needed to distinguish a first group of said instances from a second group of said instances, and identify said ROI as consisting of a set of locations in said weighted map at which said feature has the highest optimised weights.

* * * * *